Patented Nov. 4, 1930

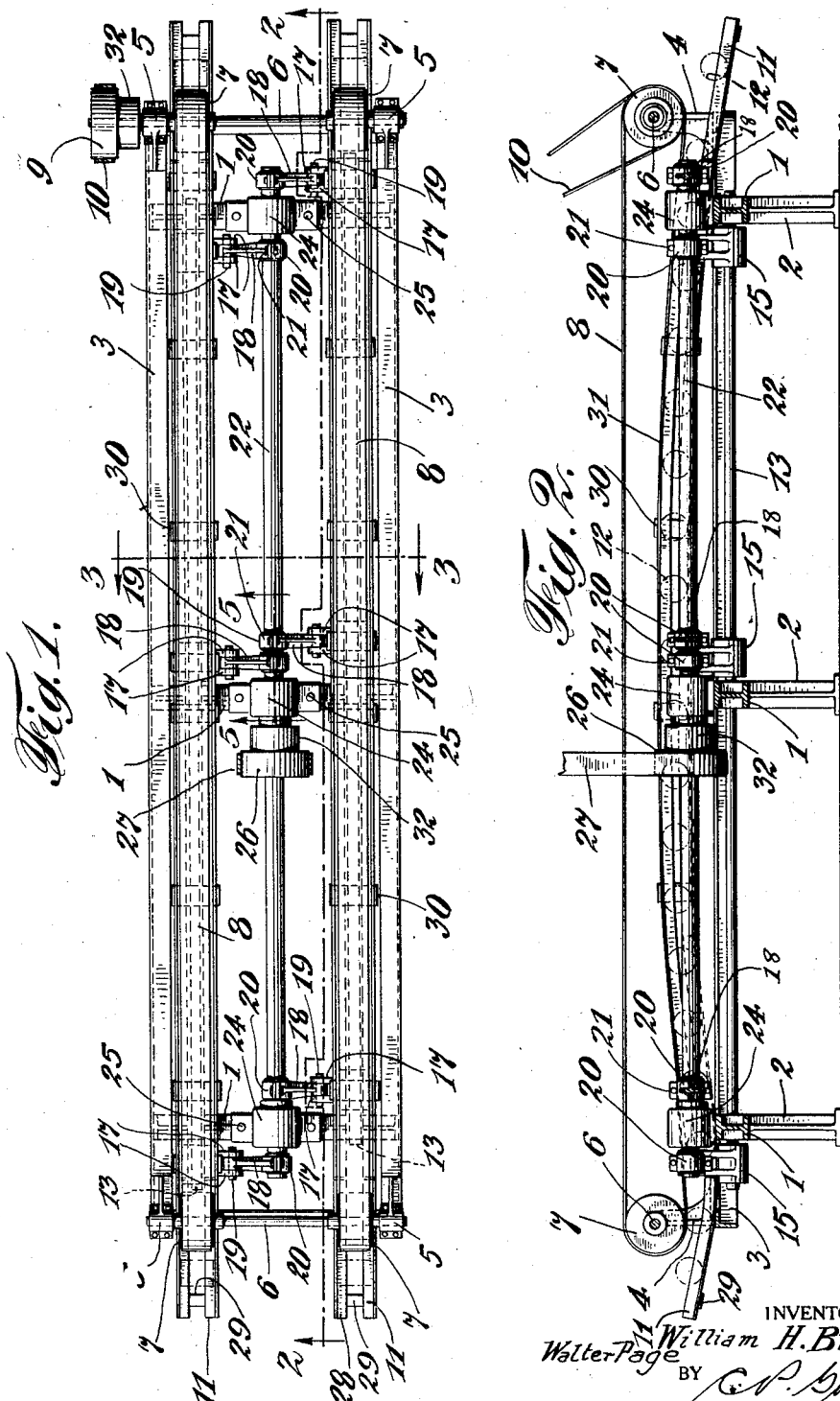

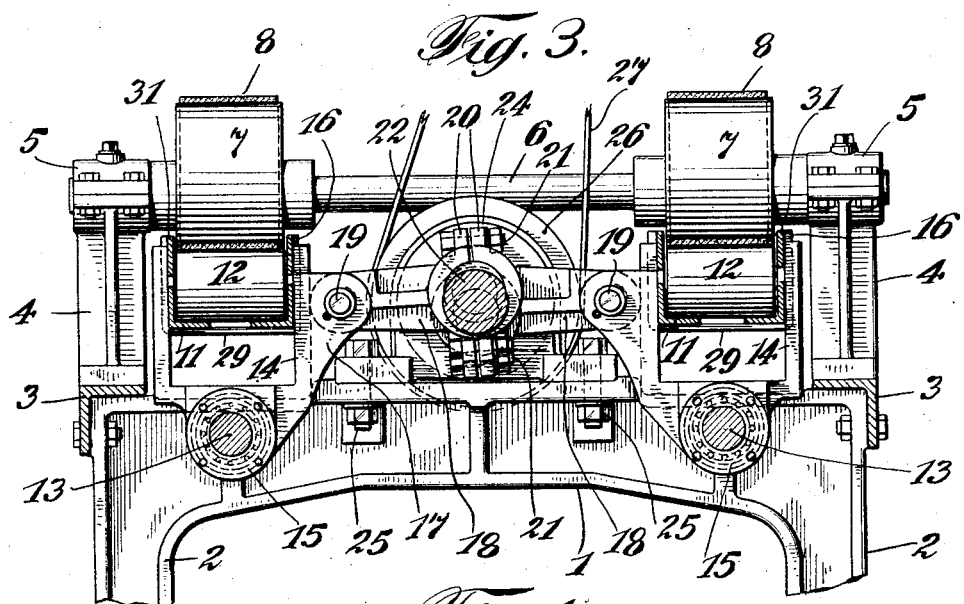
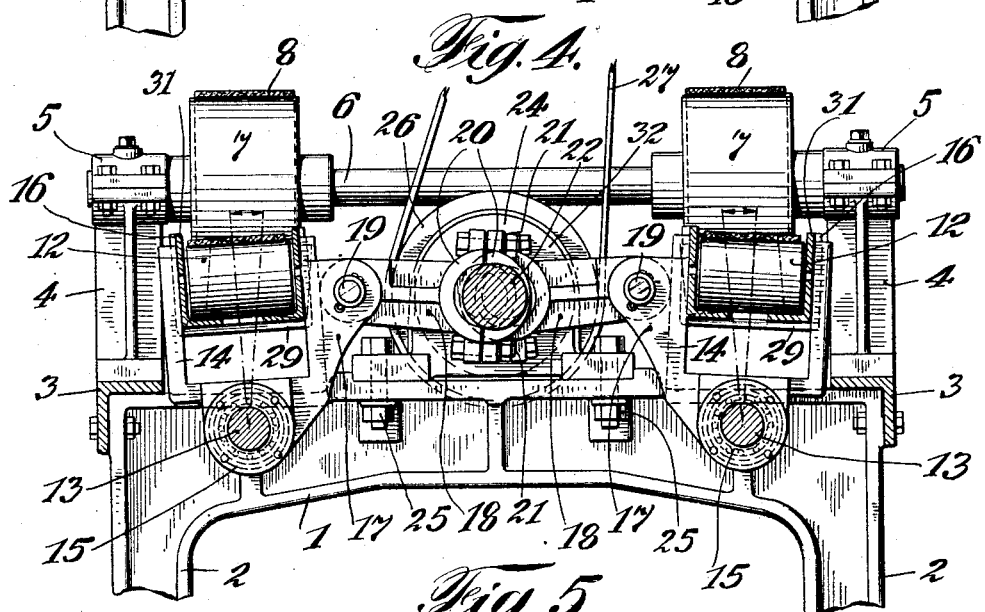
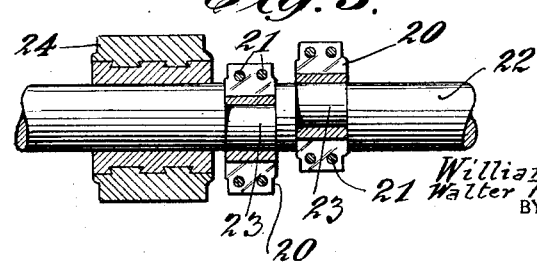

1,780,333

UNITED STATES PATENT OFFICE

WILLIAM H. BROOKS, OF OCONOMOWOC, WISCONSIN, AND WALTER PAGE, OF NEW YORK, N. Y.

APPARATUS FOR AGITATING THE CONTENTS OF STORAGE VESSELS

Application filed April 3, 1929. Serial No. 352,159.

This invention relates to apparatus for agitating the contents of storage vessels; and particularly to a machine for shaking sealed containers of foods and other substances.

When cans which have been filled with corn, milk, salad oils, paints, etc., are sealed up, the contents undergo a change with lapse of time, due to the settling of sediment from liquids when both solids and liquids are present and the separation of liquids whenever the liquids are of different specific gravity. To preserve the contents of the can to best advantage the operation of shaking becomes necessary in order to maintain the contents in a state of thorough mixture as long as possible.

An object of the invention is to provide a machine by which a sealed container can be thoroughly shaken and agitated so as to stir up the contents throughout the entire interior of the can so as to intermingle the ingredients and maintain the contents in the condition of a uniform and homogeneous mixture.

A further object of the invention is to provide a machine by which a sealed container can be agitated by rolling combined with endwise movement so as to make the operation of agitating quite efficient.

A further object of the invention is to provide a machine of such a character so designed that it is of simple construction, balanced, of large capacity, and capable of operation at a high rate.

Another object of the invention is to provide a machine for agitating cans and the like adapted to operate at various speeds so that the agitation of the contents can be regulated according to the nature thereof.

A still further object of the invention is to provide a machine of this type such that the operation may be continuous with no particular provision required for loading and unloading; the machine receiving the cans at one end and moving the same along guide ways on which the containers after their contents have been thoroughly agitated, are delivered at the other.

Other objects and advantages of the invention will appear from the following description taken with the accompanying drawings in which a preferred embodiment of my invention is illustrated. The disclosure, however, is explanatory only and we may vary details of structure without departing from the principle of the invention or exceeding the scope of the appended claims.

On the drawings,

Fig. 1 is a top plan of the machine according to our invention;

Fig. 2 is a vertical longitudinal section on line 2—2 of Fig. 1;

Fig. 3 is a cross section on the line 3—3 of Fig. 1;

Fig. 4 is a view similar to Fig. 3 showing the parts in changed positions, and

Fig. 5 is a section along the line 5—5 of Fig. 1.

On the drawings the same numerals define the same parts throughout.

The apparatus as shown comprises cross-beams 1 supported on legs 2 at their opposite ends. These cross-beams 1 and legs 2 may be made up as castings with each beam and its two legs in one piece, and as many of these castings may be utilized as required. The beams and legs are placed parallel to one another at the necessary distance apart and the ends of the beams are secured to longitudinal beams 3. These beams 3 may have the form of angle-bars in cross-section, one being at each side of the supporting framework of the machine; being secured to the top and outer ends of each cross-beam 1 by bolts or in any other suitable manner. At the end of each longitudinal beam 3 are the upright supports 4 terminating at their upper ends in bearings 5 in which are mounted shafts 6; the shafts 6 are thus two in number, one at each end of the machine and in transverse position. Each shaft carries two pulleys 7, and over these pulleys run conveyer belts 8. The pulleys are arranged in each instance adjacent to the inner side of the uprights 4 and bearings 5, so that the two belts 8 extend longitudinally of the machine along and above the inner edges of the beams 3. At one end of the machine the extremity of one shaft 6 is extended beyond the bearing 5 and there carries another pulley 9 over which passes an operating belt 10.

The rotation of the pulley 9 will turn the shaft 6, carrying it and the pulleys 7 on this shaft so as to operate the conveyers continuously to move the cans or the like containers from one end of the machine to the other.

The cans or the like are supplied to one end of the machine and travel through it in trough-shaped guide ways 11. These guide ways are wide enough to permit the cans 12 to be delivered to them in transverse position so that the cans can be passed through the machine by rolling. The guide ways may have their lower parts made of angle-bars and they are arranged beneath each of the belts 8 so that the lower parts of the belts or conveyers 8 will travel in contact with the cylindrical surfaces of the cans so as to keep them moving in the guide ways 11. These guide ways, as indicated in Fig. 2, are not straight or horizontal but are bowed upward so that a line tangent to the tops of the cans in these guide ways will be a convex curve. The guide ways are given this shape so that the lower half of each conveyer 8 can be caused to run in efficient contact with the cylindrical surfaces of the cans, engaging the cans with some degree of pressure over its whole extent. Hence the cans as they pass through the machine all receive an impulse from the conveyers 8 at every point so that they are all moved from one end of the machine to the other by rolling, and at no place are any of the cans pushed by the other cans.

The rolling of the cans will serve to shake up the contents to a certain extent but for the purpose of obtaining a more thorough agitation the cans are moved back and forth endwise at the same time. For this purpose the guide ways 11 are both mounted so that they can be oscillated from side to side to a certain extent on shafts 13. The shafts 13 are two in number, one at each side of the machine below the guide ways 11, and are mounted in bearings in the cross-beams 1. Yokes 14 are swivelled on the shafts 13 by means of bearings 15 which may contain anti-friction elements in the form of rollers or the like so as to require the minimum power to rock the yokes 14. These yokes may be provided in suitable number along each of the shafts 13, and the sides of each guide way may have ribs 16 engaging suitable vertical grooves or slots along the inner faces of the arms of each yoke. This construction makes the mounting and removal of each guide way in the yokes 14 very easily accomplished. The yokes may be provided with extensions 17 connected to operating arms 18 by means of pins 19 passing through holes in the extensions 17 and the arms 18. The opposite ends of the arms or links 18 terminate in bearing straps 20 fastened by means of bolts 21 and are actuated by means of a central shaft 22 having crank arms 23. This shaft may be mounted in bearings 24 secured to the tops of the cross-beams by bolts or the like 25, and may carry a pulley 26, to receive an operating belt 27. The rotation of the pulley 26 will therefore turn the shaft 22 and cause the arms 18 to reciprocate, oscillating the yokes 14 and move the two guide ways 11 from side to side so as to shake the cans endwise in addition to the rolling movement. The endwise shaking of the cans is not in a straight line but along arcs of circles whose centers lie in the axes of the shafts 13. Thus the endwise shaking of each can is accompanied by a tilting movement and the agitation of the contents is thus made all the more complete.

The angle-bars 28, making up the bottom or lower part of the guide ways 11, may be secured together at their ends by means of crossbars 29, and at the proper intervals along the length of these guide ways loops 30 may be provided that are approximately square in shape. These loops go around the whole guide way and over the lower parts of the belts or conveyers 8. The sides of the guide ways may also comprise bars 31 which increase the height thereof, and these bars 31 are also engaged and secured to the loops 30. Beside the pulleys 9 and 26, pulleys 32 may be mounted on the two shafts 6 and 22 of smaller diameter to reduce the speed of operation. In fact the pulleys for operating the conveyers 8 and rotating the shaft 22 may be provided in the number and size required to give several rates of operation according to the character of the contents of the cans that are to be run through the machine.

The machine is thus seen to be balanced in construction; the load and stresses in operation being distributed and equalized. By the combined endwise movement and slight tilting of the cans all crevices and corners on the inside of the can or the like vessel are affected by the agitation and the contents are well mixed. Thus food stuffs can be shaken up in the solid or semi-solid state, liquids and viscous materials can be intimately mingled, the best emulsions produced and maintained, and the contents preserved and prevented from agitating and deteriorating for longer periods. Among the uses of the apparatus are to shake up cans of corn, to cause the liquid to be evenly distributed throughout the mass, to emulsify liquids of different specific gravities, to aerate or "cream" emulsions, mayonnaise, etc.; and to mix wet and dissolve various kinds of paint and other liquids.

We claim:—

1. Apparatus for agitating the contents of containers comprising a guide way, a conveyer running above the guide way in position to make contact with containers in the guide way and roll them from one point to another, said containers being disposed in transverse position within said guide way and the guide way being bowed upward between its ends to tension the conveyer in contact with all of the containers in the guide way.

2. Apparatus for agitating the contents of sealed containers comprising a supporting framework, guide ways extending along both sides of the framework, endless conveyers over the guide ways, the containers being disposed in transverse position in the guide ways to be engaged by the lower portions of the conveyers, the guide ways being bowed adjacent their ends to enable the adjacent portions of the conveyer to make efficient contact with all of the containers in the guide ways, yokes in which the guide ways are mounted, shafts at the sides of the framework for pivotally supporting the yokes, a central shaft extending along the framework carrying cranks at spaced intervals, rods connecting said cranks to said yokes, and means for rotating said central shaft to rock the guide ways and impart endwise and tilting movement to the cans as they are rolled along the guide ways by the conveyers.

3. Apparatus for agitating the contents of containers comprising a longitudinally extending guideway upwardly bowed from end to end, a conveyer mounted above the guideway, the lower stretch of the conveyer being placed under tension by contact with containers in said guideway to thereby maintain a substantially constant relation between adjacent containers and impart a continuous rolling movement thereto between the inlet and outlet ends of the guideway.

4. Apparatus for agitating the contents of containers comprising spaced guideways and means supporting the same for transverse oscillating motion, a shaft mounted between said guideways in substantially parallel relation thereto and provided at spaced points in the length of said shaft with oppositely directed eccentric portions, and arms connected at one of their ends to adjacent eccentric portions of the shaft and having their other ends pivotally connected with the respective guideways to simultaneously oscillate the latter in the rotation of said shaft and thereby agitate the contents of containers moving through said guideways.

5. Apparatus for agitating containers comprising spaced guideways, a plurality of spaced pivotally mounted yokes supporting each of the guideways for transverse oscillating motion, a conveyer mounted above each of the guideways, the base walls of said guideways being upwardly curved from end to end whereby the lower stretches of the conveyers contacting with the containers in said guideways are placed under tension to cause a continuous rolling movement of the containers in the guideways, a single operating shaft centrally arranged between the guideways and having eccentric portions at spaced points therein, and arms connected with said eccentric portions of the shaft and with said supporting yokes for the guideways to simultaneously oscillate the latter during the rolling movement of the containers therein.

In testimony that we claim the foregoing as our invention, we have signed our names hereto.

WILLIAM H. BROOKS.
WALTER PAGE.